United States Patent
Kimes

(10) Patent No.: US 7,461,626 B2
(45) Date of Patent: Dec. 9, 2008

(54) POWERTRAIN INCLUDING A ROTARY IC ENGINE AND A CONTINUOUSLY VARIABLE PLANETARY GEAR UNIT

(75) Inventor: John W. Kimes, Wayne, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 116 days.

(21) Appl. No.: 11/643,180

(22) Filed: Dec. 21, 2006

(65) Prior Publication Data

US 2008/0149067 A1    Jun. 26, 2008

(51) Int. Cl.
*F02B 53/00* (2006.01)
*F01C 1/00* (2006.01)
*F04C 18/00* (2006.01)
*F04C 2/00* (2006.01)
*F16H 37/02* (2006.01)
*F16D 31/02* (2006.01)
*F01K 25/02* (2006.01)
*F02C 1/04* (2006.01)
*F02G 1/00* (2006.01)
*B60K 3/00* (2006.01)

(52) U.S. Cl. ............... 123/245; 123/242; 418/36; 180/302; 475/216; 475/207; 60/412; 60/650

(58) Field of Classification Search ............. 123/245, 123/241, 228; 418/35–38; 417/374; 475/216, 475/207, 5; 60/650, 409, 412, 414; 180/302, 180/65.2, 292, 297
See application file for complete search history.

(56) References Cited

U.S. PATENT DOCUMENTS 3,203,405 A * 8/1965 Sabet ....................... 418/36
3,396,632 A * 8/1968 Leblanc ................... 123/245
3,476,056 A * 11/1969 Bright ....................... 418/36
3,513,929 A * 5/1970 Kim ......................... 180/302
3,744,938 A * 7/1973 Matvey ..................... 418/36
3,765,180 A * 10/1973 Brown ..................... 180/302
3,986,575 A * 10/1976 Eggmann .................. 180/302
4,068,985 A * 1/1978 Baer ......................... 418/36
4,124,978 A * 11/1978 Wagner .................... 60/412
4,768,398 A * 9/1988 Greenwood .............. 475/216
5,138,994 A * 8/1992 Maday ..................... 123/248
5,199,391 A    4/1993 Kovalenko ............. 123/43 B
5,429,085 A * 7/1995 Stauffer ................... 123/245
5,489,765 A * 2/1996 Fezza ....................... 60/325

(Continued)

FOREIGN PATENT DOCUMENTS

GB      2384028      7/2003

(Continued)

*Primary Examiner*—Thai-Ba Trieu
(74) *Attorney, Agent, or Firm*—MacMillan, Sobanski & Todd, LLC

(57) ABSTRACT

A powertrain for driving a motor vehicle includes an internal combustion engine including first and second rotors supported for rotation about an axis, a first epicyclic gear unit including a first component fixed against rotation, a first driving component, and a first driven component, a first power path alternately producing a first drive connection between the driven component and the first rotor, and opening said first drive connection, and a second power path producing a second drive connection between the driven component and the second rotor, and opening said second drive connection.

17 Claims, 3 Drawing Sheets

U.S. PATENT DOCUMENTS

| | | | |
|---|---|---|---|
| 5,622,149 A | 4/1997 | Wittry | 123/245 |
| 5,727,518 A | 3/1998 | Blanco Palacios et al. | 123/245 |
| 6,071,098 A | 6/2000 | Richards | 418/36 |
| 6,327,858 B1 * | 12/2001 | Negre et al. | 60/650 |
| 6,446,595 B1 | 9/2002 | Sakita | 123/245 |
| 6,615,793 B1 * | 9/2003 | Usack | 123/242 |
| 7,000,727 B2 | 2/2006 | Korenjak et al. | |
| 7,315,089 B2 * | 1/2008 | Lambertson | 180/302 |
| 2003/0062205 A1 * | 4/2003 | Konrad et al. | 180/65.2 |
| 2005/0176547 A1 * | 8/2005 | DeFreitas | 475/207 |
| 2006/0032476 A1 | 2/2006 | Bowley | 74/437 |
| 2007/0199537 A1 | 8/2007 | Morgado | 123/245 |

FOREIGN PATENT DOCUMENTS

| | | |
|---|---|---|
| WO | WO 97/11258 | 3/1997 |

* cited by examiner

POWERTRAIN INCLUDING A ROTARY IC ENGINE AND A CONTINUOUSLY VARIABLE PLANETARY GEAR UNIT

BACKGROUND OF THE INVENTION

1. Field of the Invention

This invention relates generally to a powertrain that includes a rotary internal combustion engine (ICE) and a planetary gear unit. More particularly the invention relates to such a powertrain for a motor vehicle, in which the engine is driven alternately by a second power source, such as stored pneumatic pressure for starting the engine and accelerating the vehicle from a stopped condition.

2. Description of the Prior Art

Most commercial engines for motor vehicles use internal combustion engines having cylinders and reciprocating pistons, the engines operating on a four stroke Otto cycle or Diesel cycle. The pistons reciprocate within the cylinders and change direction at the end of each piston stroke, twice per power stroke. Each piston must stop at each end of stroke and accelerate again from rest after having lost its momentum, repeating this stopping and starting four times per power stroke. Linear piston displacement is converted to rotation using a crankshaft, which transmits no power when the crank and connecting rod become aligned mutually during each rotation of the crankshaft. Such engines have inherently low operating efficiency.

Rotary engines avoid these limitations and potentially have higher operating efficiency. But they too present problems that affect their cost, power output, engine wear, lubricant sealing, fuel consumption, etc.

To overcome these difficulties, electric hybrid powertrains have been developed, in which an electric motor is located in a torque path between an ICE and a transmission. Power for driving the vehicle is provided by a gasoline or diesel internal combustion engine, or by an electric motor, or by both the engine and motor. But hybrid electric powertrains are expensive to manufacture and assemble.

There is a need for a hybrid powertrain that incorporates the efficiency of a rotary IC engine, eliminates need for a torque converter, and is able to be packaged in a small space in the engine compartment adjacent a transmission.

SUMMARY OF THE INVENTION

A powertrain for driving a motor vehicle includes an internal combustion engine including first and second rotors supported for rotation about an axis, a first epicyclic gear unit including a first component fixed against rotation, a first driving component, and a first driven component, a first power path alternately producing a first drive connection between the driven component and the first rotor, and opening said first drive connection, and a second power path producing a second drive connection between the driven component and the second rotor, and opening said second drive connection.

The engine able to be packaged in a small space in the engine compartment adjacent a transmission, which requires no torque converter. The pneumatic system for starting the engine and accelerating the vehicle from rest is less expensive and has better efficiency in regenerative braking than the comparable features of an electric hybrid powertrain. Because the engine is located in the same case as the transmission, a common hydraulic pump can be used to lubricate the engine and transmission. The rotary pneumatic engine is less expensive and has better efficiency in regenerative braking than an electric machine, such as a starter/generator, inverter, and high voltage electric storage battery, which are required for brake regeneration in an electric hybrid powertrain.

The rotary engine uses four one-way clutches and a planetary gear unit to synchronize the engine blades, which divide the engine into compression chambers within which the four stages or strokes of the Otto cycle are performed.

The planetary transmission is driveably connected to the engine's output and to an air motor, supplied with a replenished charge of compressed air contained in an air tank onboard the vehicle. The transmission produces a continuously variable range of ratios of the speed of the transmission output to the speed of the engine output. The output of the engine and the carrier of the synchronizing gear unit are connected to the carrier of the transmission. The transmission's sun gear is driveably connected to an air pump/air compressor. The transmission's output is a ring gear, which drives the vehicle's wheels through a final drive gear set. The transmission's carrier is ground by four one-way clutches in the synchronizing transmission while the vehicle is being accelerated from rest using the air motor. The transmission output torque is more than two times the air motor torque and is amplified further by the final drive gear set, more than enough to launch the vehicle.

The rotary engine can operate alternately on compressed air or gasoline. The motor can be started with air and thus power is delivered to the vehicle through the air motor and by air from the engine. Eventually the engine transitions from being air-driven to gasoline-driven by adding fuel to the inlet air, spark ignition, and turning off the grounded air motor. These actions place the transmission in an overdrive state.

The engine has three spark plugs, but it can run with two active spark plugs or one active spark plug when variable engine displacement in response to operator demand is desired.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

These and other advantages will become readily apparent to those skilled in the art from the following detailed description of a preferred embodiment when considered in the light of the accompanying drawings in which.

DESCRIPTION OF THE PREFERRED EMBODIMENT

Figure 1:
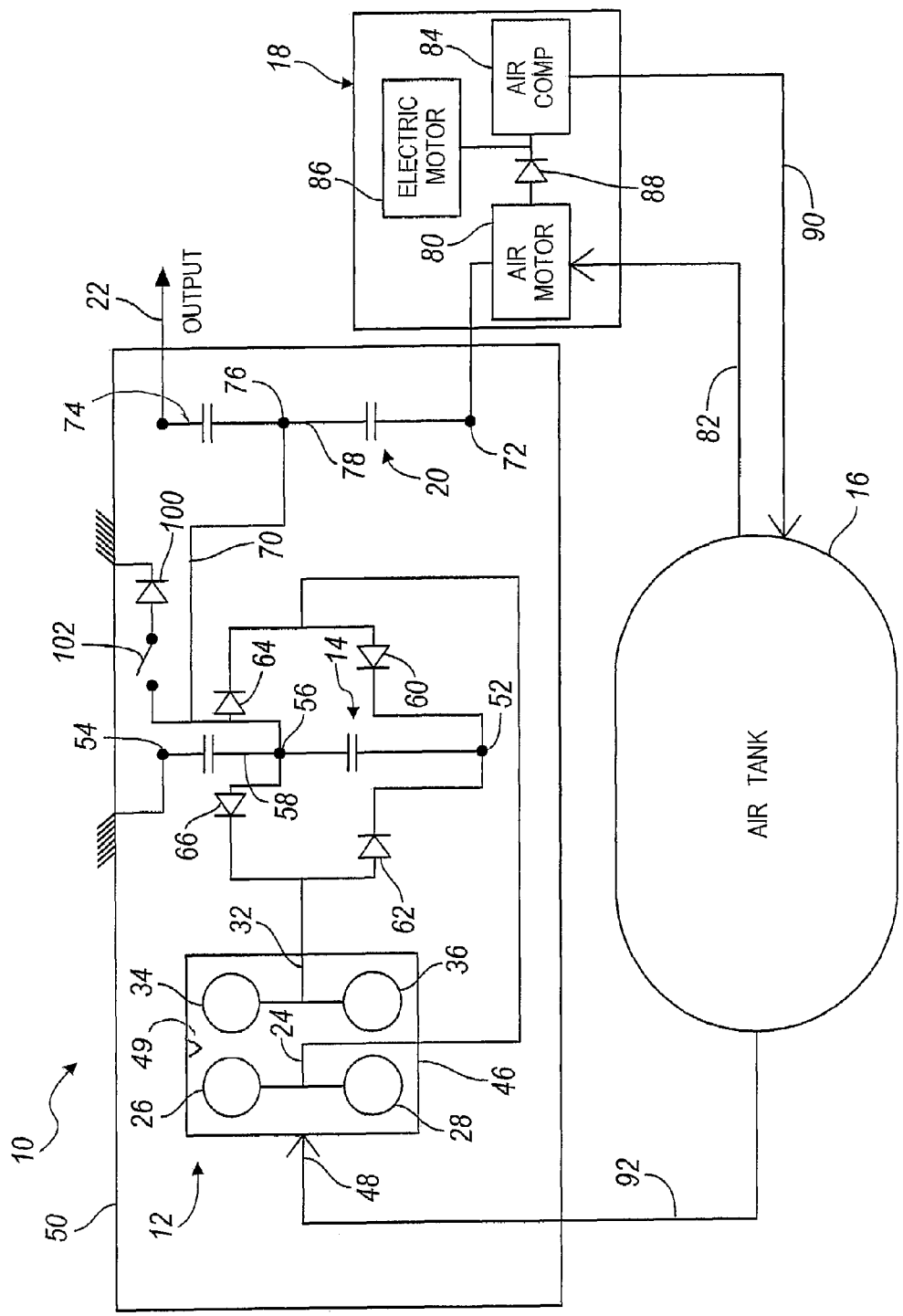
FIG. 1 is a schematic diagram showing a motor vehicle powertrain.

Referring first to FIG. 1, a powertrain 10 includes a power source 12, which can operate as a rotary internal combustion engine (ICE) using fuel as a power source, or as a motor driven by a self-replenishing energy source, such as stored pneumatic pressure. The powertrain 10 further includes a first planetary gear unit 14, a tank 16 containing pressurized pneumatic fluid, an energy conversion and brake regeneration system 18, and a second planetary gear unit 20 connected to an powertrain output 22, such as the driven wheels of a motor vehicle.

The engine 12 includes a first rotor 24 and two rotating blades 26, 28, secured to the first rotor and spaced mutually diametrically opposite on the rotor about an engine axis 30, a second rotor 32 and two rotating blades 34, 36, secured to the second rotor and spaced mutually diametrically opposite on the second rotor 24 about axis 30. The blades 34, 36 are arranged about axis 30 substantially 180° offset, i.e., out of phase with respect to blades 26, 28.

Figure 2A:
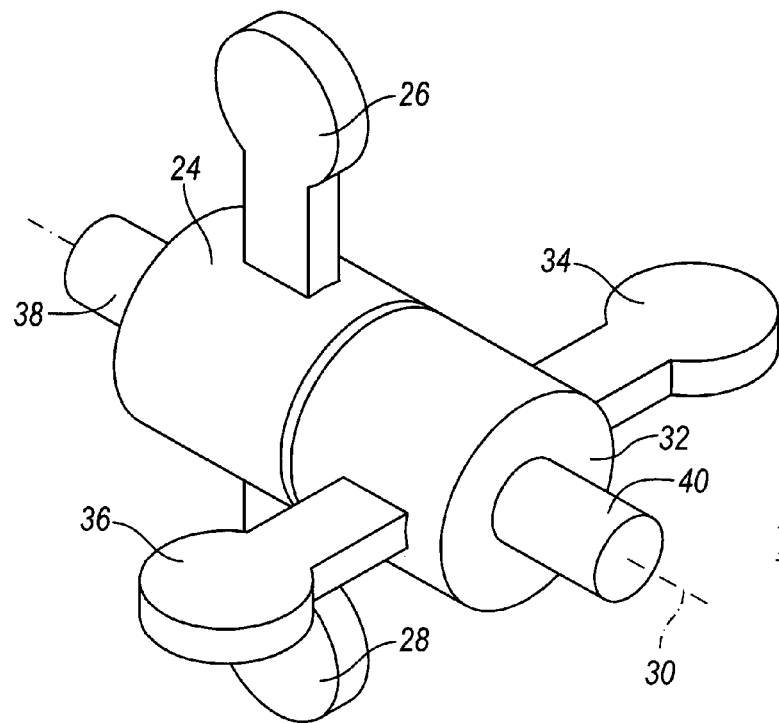
FIGS. 2A and 2B are isometric views of alternate engine rotors with the engine block removed.
Figure 2B:
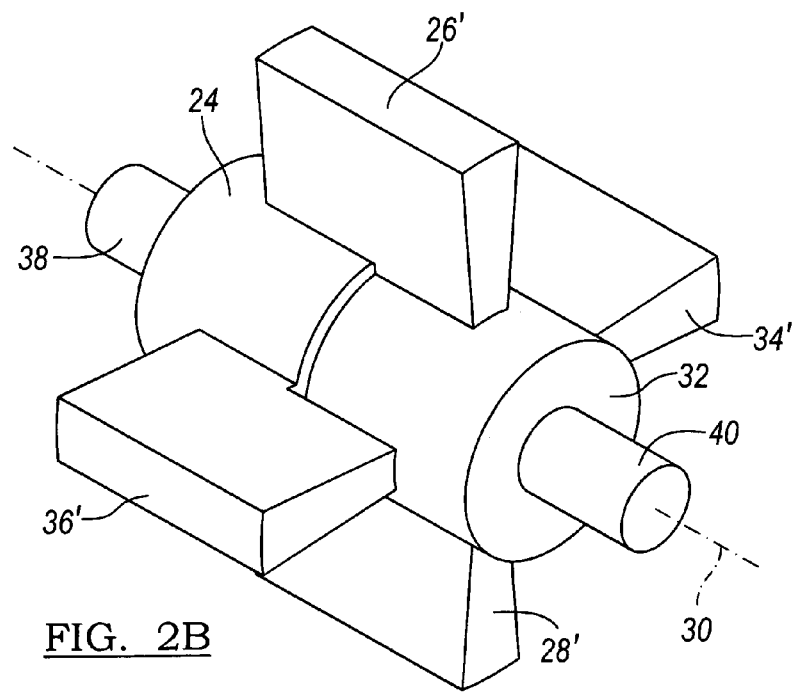

FIGS. 2A and 2B illustrate that the first engine rotor 24 is secured to a first shaft 38 and the second engine rotor 32 is secured to a second shaft 40, each shaft being aligned with axis 30.

Figure 3:
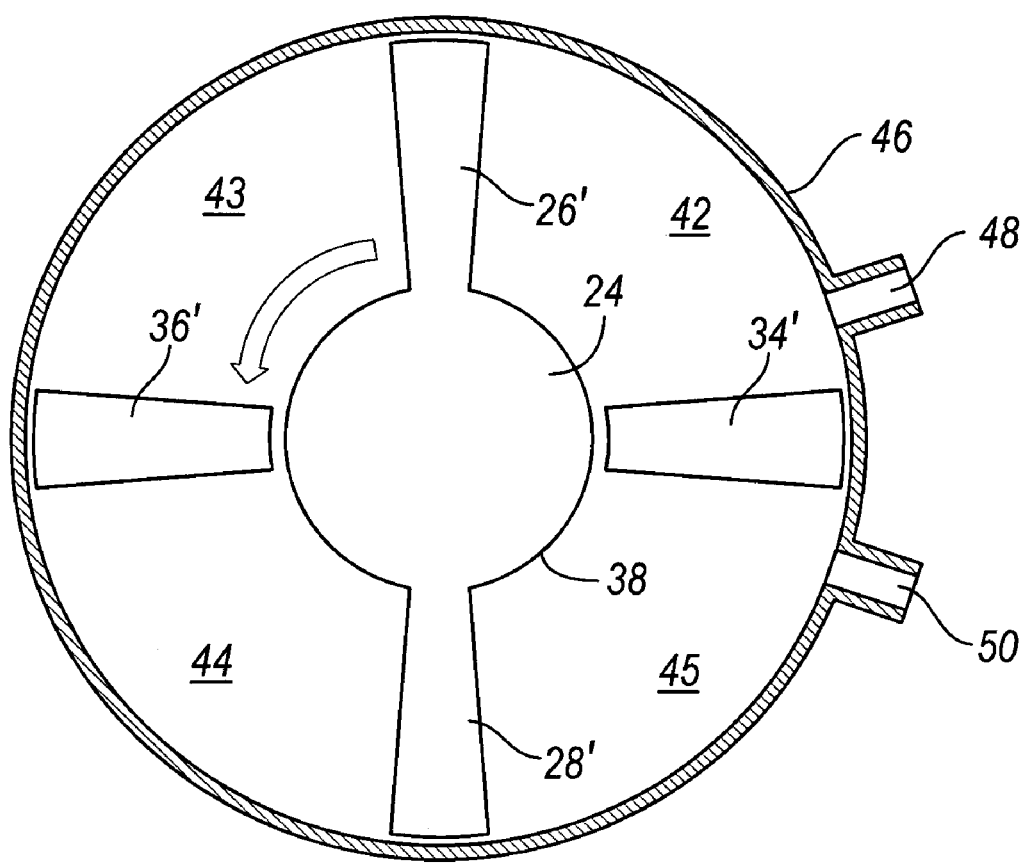
FIG. 3 is an end view of the engine shown in FIG. 1.

FIG. 3 shows that the engine 12 contains four combustion chambers 42-45 located angularly between the interleaved blades and enclosed by an engine block 46, which conforms to the shape of the outer periphery the blades 26, 28, 34, 36. Preferably as shown in FIGS. 1 and 2B, the engine blades 26, 28, 34, 36 are circular and an internal surface of the engine block 46 adjacent the blades is toroidal. Alternately as shown in FIG. 2B, the engine blades 26, 28, 34, 36 are rectangular and the internal surface of the engine block 42 adjacent the blades is cylindrical. Bearings fitted in the engine block 46 support the rotors 24, 32 for rotation about axis 30.

The engine block 46 is formed with an inlet 48, through which air or a fuel/air mixture enters each combustion chamber 42-45 as it rotates to the inlet, and an outlet 50, through which exhaust gas exits the each combustion chamber as it rotates to the outlet. A spark plug 49 secured to the engine block 46 provides a timed source of engine ignition within each rotating combustion chamber 42-45. When the engine 12 is powered by gasoline, it operates on the Otto cycle with four stages: intake, compression, power and exhaust, each stage occurring sequentially during each revolution of the rotors 24, 32 about axis 30. The engine 12 may have three spark plugs, but it can run with two active spark plugs or one active spark plug when variable engine displacement in response to operator demand is desired.

The engine 12, first planetary gear unit 14 and related components are enclosed in a housing, preferably located in an engine compartment of the motor vehicle and secured to the vehicle against rotation. The first gear unit 14 is a simple planetary gear unit, which includes a sun gear 52, a ring gear 54 surrounding the sun gear and fixed against rotation on the housing 50, a planet carrier 56, and planet pinions 58 supported for rotation on carrier 56 and continually engaged with sun gear 52 and ring gear 54.

Sun gear 52 is driveably connected to the first rotor 24 through a one-way clutch 60, which becomes locked, i.e., produces a drive connection when rotor 24 and sun gear 52 rotate in the same direction and the speed of rotor 24 is equal to or greater than the speed of sun gear 52; otherwise, clutch 60 overruns and there is no drive connection between sun gear 52 and rotor 24. Similarly, sun gear 52 and the second rotor 32 are driveably connected mutually through a one-way clutch 62, which produces a drive connection when rotor 32 and sun gear 52 rotate in the same direction and the speed of rotor 32 is equal to or greater than the speed of sun gear 52; otherwise, clutch 62 overruns and there is no drive connection between sun gear 52 and rotor 32.

Carrier 56 is driveably connected to the first rotor 24 through a one-way clutch 64, which overruns when the speed of rotor 24 is equal to or greater than the speed of carrier 56; otherwise, clutch 64 produces a drive connection between carrier 56 and rotor 24. Similarly, carrier 56 and second rotor 32 are driveably connected mutually through a one-way clutch 66, which overruns when the speed of rotor 32 is equal to or greater than the speed of carrier 56; otherwise, clutch 66 produces a drive connection between carrier 56 and rotor 32.

Preferably the pitch diameter of ring gear 54 is two times larger than the pitch diameter of sun gear 52. Due to the ring gear being held against rotation and this 2:1 ratio of the pitch diameters, carrier 56 revolves about axis 30 at one-third the speed of rotation of sun gear 52 and the magnitude of torque transmitted by carrier 56 is three times the magnitude of torque transmitted by the engine rotors 24, 32 to the engine output 70. As the rotors 24 and 32 rotate in the engine block 46, rotor 24 may be assumed to lead rotor 32 through the four engine stages.

The engine output 70 is driveably connected to the second planetary gear 20 unit 20, which functions as a split torque transmission. Gear unit 20 includes a sun gear 72, a ring gear 74 surrounding the sun gear and fixed to the powertrain output 22, a planet carrier 76 driveably connected to engine output 70, and planet pinions 78 supported for rotation on carrier 76 and continually engaged with sun gear 22 and ring gear 24.

An air motor 80, secured to sun gear 72, pneumatically communicates through line 82 with the air tank 16. An air compressor 84, continually, driveably connected to an electric motor 86 and connected through a one-way clutch 88 to the air motor and driven by the air motor 80 and/or electric motor 86, supplies compressed air to tank 16 through line 90. Kinetic energy of the vehicle can be recovered and stored in tank 16 during wheel braking conditions by having the wheels drive the air compressor 84. Compressed air is supplied from tank 16 to the combustion chambers 42-45 of the engine rotors 28, 32 through inlet 48 and line 92 when starting the engine 12.

Therefore, during forward drive operation, when combustion of the air/fuel mixture occurs in a combustion chamber such that a blade 26, 28 of rotor 24 is driven by that combustion, sun gear 52 is driven through clutch 60; clutch 66 is locked to carrier 56, thereby preventing reverse rotation of rotor 32; clutches 62 and 64 overrun; and carrier 56 drives the engine output 70 in the direction of rotor 24 and at one-third the speed of rotor 24. Sun gear 72 may be driven by air motor 82 in the opposite direction from that of carrier 76, or sun gear 72 may be held against rotation by air motor 80. When sun gear 72 is driven by air motor 82 in the opposite direction from that of carrier 76, gear unit 20 overdrives output 22 in a relatively low speed range. When sun gear 72 is held against rotation by air motor 80, gear unit 20 overdrives output 22 at a higher speed range.

When combustion of the air/fuel mixture occurs in the next combustion chamber such that a blade 34, 36 of rotor 28 is driven by that combustion, sun gear 52 is driven through clutch 62; clutch 64 is locked to carrier 56, thereby preventing reverse rotation of rotor 24; clutches 60 and 66 overrun; and carrier 56 drives the engine output 70 in the direction of rotor 32 and at one-third the speed of rotor 32. Meanwhile, sun gear 72 is driven by air motor 82 at a speed that will produce a desired speed and torque at output 22 in response to the driver demanded torque and speed at powertrain output 22 and compatible with the speed and torque produced by the engine 12 at it output 70 and carrier 76.

The powertrain may include a selectable one-way clutch 100 for reverse drive operation. When the vehicle operator selects reverse drive operation by manually moving the gear selector to the reverse drive position, an electronic controller produces a command output signal, which closes a switch 102, thereby producing a drive connection through clutch 100 between carrier 56 and housing 50. This action holds carrier 56 against rotation, releases ring gear 54 from its connection to housing 50, and connects ring gear 54 to the engine output 70. Therefore, with sun gear 52 driven by the engine rotors 24, 32 and carrier 56 held against rotation, the ring gear 54 and output 70 are driven in a reverse direction. The speed of ring gear 54 and output 70 is one-half the speed of sun gear 52, provided the pitch diameter of the ring gear is twice the pitch diameter of sun gear.

In accordance with the provisions of the patent statutes, the preferred embodiment has been described. However, it should be noted that the alternate embodiments can be practiced otherwise than as specifically illustrated and described.

I claim:

1. In a powertrain that includes an internal combustion engine including multiple rotors supported for rotation about an axis, a first gear unit driveably connected to the engine rotors through a first one-way power path that connects the first gear unit and the first rotor and a second one-way power path that connects the first gear unit and the second rotor, an air motor pneumatically communicating with and driven by the a source of compressed air, and an epicyclic second gear unit driveably connected to the output of the first gear unit, the air motor and the powertrain output, a method for operating the powertrain comprising the steps of;
   (a) using the first epicyclic gear unit, first power path and second power path to synchronize the engine rotors;
   (b) using the air motor and source of compressed air to start the engine; and
   (c) using the air motor to control a speed ratio produced by the epicyclic second gear unit.

2. The method of claim 1, further comprising the steps of:
operating the engine as an internal combustion engine;
using the first epicyclic gear unit, first power path and second power path to overdrive the engine output relative to the speed of the engine; and
using the air motor to control the magnitude of a ratio of the speed of the output of the epicyclic second gear unit and a speed of the output of the first epicyclic gear unit.

3. A powertrain for driving a motor vehicle comprising:
an internal combustion engine including multiple rotors supported for rotation about an axis;
a first epicyclic gear unit including a first component fixed against rotation, a first driving component, and a first driven component;
a first power path alternately producing a first one-way drive connection between the driven component and the first rotor; and
a second power path producing a second one-way drive connection between the driven component and the second rotor;
a source of compressed air;
an air motor pneumatically communicating with and driven by the source of compressed air; and
a second epicyclic gear unit including a carrier driveably connected to the first driven component, a second driven component driveably connected to the powertrain output, and a sun gear driveably connected to the air motor.

4. The powertrain of claim 3 wherein:
a first power path alternately connects the driven component and one of the first rotor and the second rotor when a speed of said one of the first rotor and the second rotor is equal to or greater than a speed of the first driving component, and disconnects the driven component from said one of the first rotor and the second rotor; and
a second power path connects the driven component and the other of said one of the first rotor and the second rotor and when a speed of the other of said one of the first rotor and the second rotor is equal to or greater than a speed of the first driving component, and disconnects the driven component from said other of said one of the first rotor and the second rotor.

5. The powertrain of claim 3 wherein:
the first component is a ring gear;
the first driving component is a sun gear surrounded by the ring gear;
the first driven component is a carrier; and
the powertrain further comprises planet pinions supported for rotation on the carrier and engaged with the sun gear and the ring gear.

6. The powertrain of claim 3 further comprising:
a first casing containing the engine, the first epicyclic gear unit, the first power path, the second power path, and the second epicyclic gear unit.

7. The powertrain of claim 3 further comprising:
powertrain output;
a source of compressed air;
an air motor pneumatically communicating with the source of compressed air; and
the second epicyclic gear unit includes a second driving component driveably connected to the first driven component, a second driven component driveably connected to the powertrain output, and a control component driveably connected to the air motor.

8. The powertrain of claim 7 wherein:
the second driven component is a second ring gear;
the second driving component is a second carrier;
the control component is a second sun gear; and
the second epicyclic gear unit further comprising second planet pinions supported for rotation on the second carrier and engaged with the second sun gear and the second ring gear.

9. A powertrain for driving a motor vehicle comprising:
an internal combustion engine including first and second rotors supported for rotation about an axis;
a first epicyclic gear unit including a first component fixed against rotation, a first driving component, and a first driven component;
a first power path alternately producing a first drive connection between the driven component and the first rotor, and opening said first drive connection;
a second power path producing a second drive connection between the driven component and the second rotor, and opening said second drive connection;
powertrain output;
a source of compressed air;
an air motor pneumatically communicating with the source of compressed air; and
an epicyclic transmission gear unit including a second driving component driveably connected to the first driven component, a second driven component driveably connected to the powertrain output, and a control component driveably connected to the air motor.

10. The powertrain of claim 9 wherein:
the first rotor includes a first blade secured to the first rotor, and a second blade secured to the first rotor and spaced angularly about the axis mutually diametrically opposite the first blade; and
a second rotor includes a third blade secured to the second rotor, and a fourth blade secured to the second rotor and spaced angularly about the axis mutually diametrically opposite the third blade, the third blade being angularly arranged about the axis between the angular position of the first blade and the second blade.

11. The powertrain of claim 9 wherein:

a first power path alternately produces a first drive connection between the driven component and one of the first rotor and the second rotor when a speed of said one of the first rotor and the second rotor is equal to or greater than a speed of the first driving component, and opens said first drive connection; and a second power path produces a second drive connection between the driven component and the other of said one of the first rotor and the second rotor and when a speed of the other of said one of the first rotor and the second rotor is equal to or greater than a speed of the first driving component, and opens said second drive connection.

12. The powertrain of claim 9 wherein:

the first component is a ring gear;

the first driving component is a sun gear surrounded by the ring gear;

the first driven component is a carrier; and the powertrain further comprises planet pinions supported for rotation on the carrier and engaged with the sun gear and the ring gear.

13. The powertrain of claim 9 further comprising:

a first casing containing the engine, the epicyclic gear unit, the first power path, the second power path, and a transmission gear unit.

14. The powertrain of claim 9 wherein:

the second driven component is a second ring gear;

the second driving component is a second carrier;

the control component is a second sun gear; and the second epicyclic gear unit further comprising second planet pinions supported for rotation on the second carrier and engaged with the second sun gear and the second ring gear.

15. The powertrain of claim 9 further comprising:

the air motor being driven by air contained in the source of compressed air; and an air compressor driveably connected to the air motor and pneumatically communicating with the source of compressed air, the air compressor being driven by the air motor and supplying compressed air to the source of compressed air.

16. The powertrain of claim 9 further comprising:

an electric motor; and the air compressor being driveably connected to the electric motor and supplying compressed air to the source of compressed air.

17. The powertrain of claim 9 further comprising:

an electric motor;

the air motor being driven by air contained in the source of compressed air; and an air compressor driveably connected to the air motor and the electric motor, and pneumatically communicating with the source of compressed air.

* * * * *